UNITED STATES PATENT OFFICE 2,596,562

PREPARATION OF 21-ACYLOXY ALLOPREGNANES

Stephen Kaufmann, George Rosenkranz, and John Pataki, Mexico City, Mexico, assignors to Syntex S. A., Mexico City, Mexico, a corporation of Mexico No Drawing. Application January 23, 1950, Serial No. 140,151

8 Claims. (Cl. 260—397.4)

The present invention relates to a process for preparing cyclopentanophenanthrene derivatives.

More particularly the present invention relates to a process for the production of 17α-hydroxy-20-keto-21-acyloxy allopregnane derivatives.

The introduction of the 21-acetoxy-group into 17-hydroxyallopregnane compounds represents a difficult problem. In fact, I. Salamon and T. Reichstein (Helv. Chim. Acta 30, 1619 (1947)) attempted unsuccessfully to convert the bromine atom into an acetoxy group in 21-bromoallopregnane-3β,17β-diol-20-one 3,17-diacetate by reacting the latter with alkali or silver acetate.

In accordance with the present invention, the surprising discovery has been made, however, that the conversion of the 21-halogen atom into an acetoxy group takes place very smoothly when the 17-hydroxy group is in the α position. In accordance with the present invention, therefore, it was found that the halogen atom in the 21-position could be converted into the 21-acetoxy group in compounds of the following general formula:

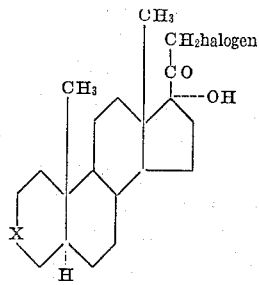

In the above formula X is selected from the group consisting of C=O, CH₂,

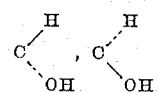

or a radical convertible to

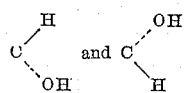

The above compounds, which may be characterized as 17α-hydroxy-20-keto-21-halogen allopregnane derivatives can be converted into the corresponding 21-acylates by reacting the corresponding 21-bromo compound with an excess of an alkali metal salt of a lower fatty acid. Preferably the compounds are first dissolved in a suitable organic solvent for the compound, as for example, a lower ketone solvent, i. e. acetone. The reaction preferably takes place upon heating or refluxing the bromo compound with the alkali metal lower fatty acid salt. Typical alkali metal lower fatty acid salts for the reaction are potassium or sodium acetate, potassium or sodium propionate, etc. The allopregnane compounds, which are thus reacted, may be otherwise substituted or unsubstituted in the ring system, for example, substituents in the ring system may consist of hydroxyl, alkoxyl, acyloxyl or keto groups, or the corresponding thio derivatives and other ether groups. The 21-halogen derivatives, which are the starting materials for the present invention, may be readily produced by brominating the corresponding allopregnane compound in a conventional manner. Thereafter the corresponding iodo derivative, for example, may be prepared by reacting the 21-bromo compound with an alkali metal iodide, such as sodium iodide.

The following specific examples serve to illustrate the present invention but are not intended to limit the same:

Example I

To a solution of 5 grams of 21-bromoallopregnane-3β,17α-diol-20-one 3-acetate (Reichstein's substance L conventionally esterified in the 3-position and conventionally brominated in the 21-position) in 200 cc. of acetone were added 20 grams of potassium acetate. The mixture was refluxed for 6 hours, concentrated and poured into water. The precipitate was filtered, washed thoroughly with water and dried. After recrystallization first from chloroform-methanol and then from benzene, the allopregnane-3β,17α,21-triol-20-one 3,21-diacetate (Reichstein's substance P) melted at 208 to 210° C.

Example II

To a solution of 5 grams of 21-bromoallopregnane-3β,17α-diol-20-one 3-acetate in 200 cc. of acetone were added 2.5 grams of sodium iodide dissolved in 50 cc. of acetone. After refluxing for 15 minutes the preciptated sodium bromide was filtered and the filtrate containing the 21-iodo derivative was refluxed with 20 grams of potassium acetate for 5 hours. The reaction mixture was worked up in the same manner as in Example I, whereby pure allopregnane-3β,17α-21-triol-20-one 3,21-diacetate with melting point 208 to 210° C. was obtained.

Example III

To a solution of 10 grams of 21-bromoallopregnane-3β,17α-diol-20-one in 600 cc. of acetone were added 40 grams of potassium acetate. The reaction mixture was refluxed for 6 hours, concentrated and poured into water. The precipitate was recrystallized from methanol whereby pure allopregnane-3β,17α,21-triol-20-one 21-acetate of melting point 235 to 236° C. was obtained.

*Example IV*

To a solution of 5 grams of 21-bromoallopregnane-17α-ol-3,20-dione (prepared by conventionally brominating in the 21-position allopregnane-17α-ol-3,20-dione, prepared in accordance with the application of George Rosenkranz, Stephen Kaufmann and John Pataki, Serial No. 116,624, filed September 19, 1949) in 500 cc. of acetone are added 20 grams of potassium acetate. The reaction mixture is refluxed for 6 hours, concentrated and poured into water. The precipitate is crystallized from ethyl acetate giving pure allopregnane-17α,21-diol-3,20-dione 21-acetate of melting point 244 to 247° C.

It will be obvious to those skilled in the art that various changes may be made without departing from the spirit of the invention and therefore the invention is not limited to what is described in the specification but only as indicated in the appended claims.

We claim:

1. A method for producing 17-hydroxy-20-keto-21-acyloxyl allopregnane compounds, which comprises reacting 21-halogen-17α-hydroxyl-20-keto allopregnane compounds with an alkali metal salt of a lower fatty acid in an organic solvent for the 21-halogen-17α-hydroxy-20-keto allopregnane compounds.

2. A method for producing allopregnane-3β,17α,21-triol-20-one 3,21-diacetate, comprising reacting 21-halogen-allopregnane-3β,17α-diol-20-one 3-acetate with an alkali metal acetate in an organic solvent for said 21-halogen-allopregnane-3β,17α-diol-20-one 3-acetate.

3. A method for producing allopregnane-3β,17α,21-triol-20-one 3,21-diacetate, comprising reacting 21-bromoallopregnane-3β,17α-diol-20-one 3-acetate with an alkali metal acetate in an organic solvent for said 21-bromoallopregnane-3β,17α-diol-20-one 3-acetate.

4. A method for producing allopregnane-3β,17α,21-triol-20-one 3,21-diacetate, comprising reacting 21-iodo allopregnane-3β,17α-diol-20-one 3-acetate with an alkali metal acetate in an organic solvent for said 21-iodoallopregnane-3β,17α-diol-20-one 3 acetate.

5. A method for producing allopregnane-3β,17α,21-triol-20-one 21-acetate comprising reacting 21-halogen-allopregnane-3β,17α-diol-20-one with an alkali metal acetate in an organic solvent.

6. A method for producing allopregnane-3β,17α,21-triol-20-one 21-acetate, comprising reacting 21-bromoallopregnane, 3β,17α-diol-20-one with an alkali metal acetate in an organic solvent for said 21-bromoallopregnane, 3β,17α-diol-20-one.

7. A method for producing allopregnane-17α,21-diol-3,20-dione 21-acetate comprising reacting 21-halogen-allopregnane-17α,ol-3,20-dione with an alkali metal acetate in an organic solvent for said 21-halogen-allopregnane-17α,ol-3,20-dione.

8. A method for producing allopregnane-17α,21-diol-3,20-dione 21-acetate, comprising reacting 21-bromoallopregnane-17α-ol-3,20-dione with an alkali metal acetate in an organic solvent for said 21-bromoallopregnane-17α-ol-3,20-dione.

STEPHEN KAUFMANN.
GEORGE ROSENKRANZ.
JOHN PATAKI.

REFERENCES CITED

The following references are of record in the file of this patent:

UNITED STATES PATENTS

| Number | Name | Date |
| --- | --- | --- |
| 2,232,730 | Reichstein | Feb. 25, 1941 |
| 2,359,772 | Marker | Oct. 10, 1944 |
| 2,409,043 | Inhoffen | Oct. 8, 1946 |
| 2,423,517 | Reichstein | July 8, 1947 |